Patented Dec. 19, 1933

1,939,932

UNITED STATES PATENT OFFICE 1,939,932

PREPARED RESIN

Charles A. Thomas, Dayton, Ohio, assignor to Dayton Synthetic Chemicals, Incorporated, Dayton, Ohio, a corporation of Ohio No Drawing. Application March 30, 1931
Serial No. 526,578

19 Claims. (Cl. 260—2)

This invention relates to the manufacture of artificial or prepared resins.

One of the principal objects of this invention is to provide such a prepared resin of superior character and valuable properties and a method of preparing such a resin.

Another object of this invention is to provide such a prepared resin produced from a terpene and a substituted benzene.

Another object of this invention is to provide such a prepared resin produced from a terpene, or a mixture of terpenes.

Other objects and advantages of the invention will be apparent from the following descriptions and appended claims.

In the practicing of this invention a terpene, or mixture of terpenes, or a mixture of a terpene with a substituted benzene, such as alkyl benzene, is reacted in the presence of suitable catalyst, such as anhydrous aluminum chloride, to produce by polymerization and/or condensation a resinous reaction product adapted to commercial uses.

Terpenes are unsaturated carbocyclic hydrocarbons, having the formula $C_{10}H_{16}$, and are distinguished by their ring formation from the open chain diolefines, such as isoprene. In carrying out this invention various terpenes or sesquiterpenes may be used with various substituted benzenes. For example, very satisfactory results have been secured by using a terpene such as pinene with a substituted benzene such as toluene or the xylenes or their homologues. Other substituted benzenes have been found to produce satisfactory resins, for example, ortho, meta, and para xylene or a commercial mixture of xylenes, toluene, mesitylene, and amyl benzene. Pure terpenes, such as pinene and dipentene, and crude or commercial mixtures of terpenes, such as turpentine, cedar oil, or cedrene, have been used to react with the above mentioned substituted benzenes. These terpenes or mixtures of terpenes have also been used alone to produce resins in the manner described. Other substituted benzenes and terpenes may be used in a similar manner.

The term terpene is herein used to designate true terpenes or unsaturated carbocyclic hydrocarbons distinguished by their properties and by their ring structure from open chain diolefines.

As an example of the carrying of this invention into effect the following procedure is described using one mol pinene to two mols toluene. A mixture of these hydrocarbons in the proportions specified is placed within a suitable container or polymerizing vessel, and an activating compound such as powdered anhydrous aluminum chloride is added while the mixture in the vessel is being agitated. The aluminum chloride is preferably pulverized to give better contact and to increase the rate of and ease of solution. The activating compound is added in small quantities at a time while the contents of the polymerizing vessel are being agitated. It is found that the activity of the catalyst is directly proportional to the amount which goes into solution in the reaction mixture. It is therefore desirable that the solution should be as complete and as rapid as possible. For this reason rapid agitation during the addition of the catalyst and during the polymerization reaction is desirable. When 25 gallons of a mixture of active ingredients are to be treated within the polymerizing vessel, aluminum chloride may be added in quantities of approximately 6 to 8 ounces at a time. With the addition of the first batch of aluminum chloride there is a rather active chemical reaction with a resultant rise in temperature. Where an atmospheric polymerizing vessel is used it is desirable that the temperature of the reaction be controlled so that it is not permitted to rise much above 40 degrees C. Otherwise the polymerizing vessel should be kept under pressure to prevent undue volatilization and loss of resin. Polymerization at higher temperatures, such as above 65° C., requires a special pressure vessel. Very satisfactory results are secured when the temperature is controlled between 25° and 35° C., this being readily accomplished by introducing the aluminum chloride in small amounts with proper agitation to prevent local overheating and by cooling the reaction mass by a suitable cooling jacket. This polymerizing reaction is preferably carried out in the absence of water. Water present during the reaction hydrolyzes the catalyst to form an acid which in turn affects reaction, resulting in a darker and quite different resin product.

Additional batches of aluminum chloride are added from time to time as may be done without unduly increasing the temperature of the reaction mass, and this is repeated with continuous agitation until no further temperature rise results. The amount of aluminum chloride used is also controlled in accordance with the materials being treated as this materially affects the yield and character of the resin. As the amount of catalyst used is increased, the yield of resin is found to increase, while the resin tends to be harder, lighter in color and lower in iodine number. The quantity of catalyst needed for producing the particular grade or quality of resin desired can be readily determined by tests for the particular ingredients being treated. Thus, when treating the above mixture in 25 gallon batches, satisfactory results are secured by the addition of about 10 pounds of catalyst, this being equivalent to approximately 5.0 grams of catalyst for 100 c. c. of active ingredients.

In addition to aluminum chloride, other metallic halide compounds such as chlorides of iron, zinc, antimony, indium, titanium, tin, and boron may be used. The reaction may proceed as much as 12 hours, but it is found desirable not to leave the catalyst in contact with the materials for a period of time much in excess of this, as the resin may be darkened. It appears that the yields of resin do not continue to increase in a straight line function with the amount of catalyst added. At a certain point the yield as well as the iodine number appears to become constant. It is also found that the density of the polymerized product at this point becomes constant, and that the addition of more catalyst does not increase the specific gravity of the polymerized mass. It may be that the reason the action does not proceed beyond such a point, is that at that point the mixture is saturated with catalyst. If this is true, since the yield and iodine value appear to be proportional to the amount of catalyst in solution, and since no more solution can be effected at the given temperature the reaction stops at this point. When desired, however, the reaction may be stopped at an intermediate point, after the addition of the requisite amount of catalyst.

The resulting reaction product is a viscous mass dark in color. This viscous material is then neutralized to terminate or kill the polymerizing reaction. Various water soluble alkalies may be used for this neutralizing, but preferably ammonia is employed as the excess of this material can be removed by distillation and has no injurious effects on the resulting resin. The neutralizing treatment is preferably carried out in the presence of an organic hydroxy compound, which is effective to supply hydroxyl radicals for the decomposition and precipitation of the aluminum chloride or other activating agent present. An alcohol, such as ethyl alcohol, functions very satisfactorily for this purpose. Other organic liquids which are miscible with water, such as methyl alcohol, acetone, etc., may be used for this purpose. Thus a mixture of about 40% by volume of ammonium hydroxide containing 28% NH$_3$ by weight and 60% by volume of 95% ethyl alcohol gives good results. With the quantity specified above, 25 gallons of unsaturated hydrocarbons, slightly more than 3 gallons of this mixture is used, the amount theoretically required being approximately 3.2 gallons of the above mixture. The mass is agitated constantly during the neutralization and a flocculent precipitate of the activating agent is produced which is readily removed by filtration—for example where aluminum chloride is used a precipitate of aluminum hydroxide is formed. The neutralization is accompanied by a color change, the reacting mass changing from a black or dark red to a yellowish red as the neutralization is completed. The neutralizing reaction is completed in about a half hour.

After the neutralizing reaction is completed the contents of the neutralizing vessel are preferably heated by means of a suitable temperature controlling jacket to a temperature of about 60°—80° C., or until the distillate comes over clear. That is, the distillation is continued until no more water comes over. For the amounts specified, this operation is continued 1 to 2 hours. During this heating substantially all the excess ammonia and alcohol is liberated and is allowed to pass off to a suitable condenser for the recovery. In this process it is found desirable that substantially all of the water, ethyl alcohol, and NH$_3$ be removed to prevent precipitation of the resin and consequent clogging of the filter. If the resin is to be used in a varnish it is exceedingly important that all of the water, alcohol and ammonia are removed by heating, because if a small amount of ammonium chloride formed in the neutralization is held in solution in the resin hydrocarbon mix by the presence of water and alcohol, then when the resin is hardened such ammonium chloride will be occluded in the hard gum. When such gum is used with drying oils such as linseed oil, China wood oil, etc., it reacts with the oils to darken them and also makes the varnish less durable.

When the neutralization is carried out in the presence of water as described above, the subsequent distillation is more difficult and water may be occluded in the resin resulting in an opaque product. Where a clear resin is essential, or for more convenient plant operation, it may be desirable to carry out the neutralizing operation in the absence of water. In such case an anhydrous ethyl alcohol, or other organic hydroxy liquid of the character specified, saturated with dry NH$_3$ gas can be used for the neutralization with very satisfactory results. When no aqueous solutions have been used, the above distillation can be carried out in less time than specified above.

When reacting terpenes and substituted benzenes in this manner, it is found that two products are formed, one being an amorphous resin compound readily soluble in benzol, and another being a gelatinous compound insoluble in such solvents. This insoluble compound is carried down in the precipitate. In order to insure complete solution of the resinous product and to facilitate the filtering operation, an organic solvent which is immiscible with water, for instance a hydrocarbon solvent such as benzol, or other organic solvents such as carbon tetrachloride, ethylene dichloride, etc., is added to the neutralized mass after free water and ammonia have been distilled off. In the distillation process approximately one-half of the original reaction mixture used is usually distilled off. The amount of solvent added is then approximately equal to the volume distilled off; that is, for the quantities specified about 12 gallons of benzol are added to the neutralized and distilled mass with very satisfactory results.

The neutralized mass mixed with benzol is then passed through a suitable filter, such as a conventional filter press, where the undissolved materials including the precipitated activating agent are removed from the liquid. The filtered sludge removed in the filter press is preferably treated to recover aluminum oxide (Al$_2$O$_3$) and ammonium chloride (NH$_4$Cl) as by-products. In place of the filter press a suitable type of centrifuge may be used if desired.

The clear filtrate containing the resin in solution is allowed to pass into a distillation vessel provided with a suitable heating jacket for the introduction of a heating medium such as steam or oil. The material within the distillation vessel is now heated as by means of a jacket to distill off the more volatile constituents, including benzol, which may pass off to a suitable condenser so as to be recovered for repeated use in the process. Distillation is continued until the thermometer in the distillation line rises to approximately 100° C., at which time substantially all of the benzol will have been driven off of the resulting resin which is left in the distillation vessel as a semi-fluid or pasty mass, termed herein a "soft resin".

This soft resin also contains varying proportions of higher oils, primarily unsaturated hydrocarbon oils of rather high molecular weight, which are not removed by distillation at temperatures not exceeding 100° C.

If desired, the concentration of the resin may be controlled so as to leave a calculated amount of solvent in the resin so that it is maintained in solution form. This solution may then be withdrawn to a convenient place of storage. The resin in solution form in benzol, or other solvent such as solvent naphtha, may be used directly in the paint and varnish industries, or for other suitable uses without concentration to dryness. If a solid or hard resin is desired, the distillation is continued as described above until substantially all of the readily volatile solvents and higher oils have been driven off. At the same time the temperature of the mass may be raised by means of the heating jacket to a controlled higher temperature.

Where a gas such as air is passed through the resinous mass kept well agitated, the heating jacket may be raised to a higher temperature of the order of 180° C. with resultant rapid increase in the drying and hardening of the resin without injury to the resin. This may be readily accomplished by supplying oil heated to a temperature of about 180° C. to the external jacket. This treatment drives off the remaining solvent and higher oils present in the resin which tend to make it soft.

By avoiding the use of steam or substantial quantities of water throughout the drying process, the occlusion of water in the resin is avoided and a clear product obtained. But steam distillation may be advantageously used if occluded water makes no difference in the product, that is, when a clear resin is not desired. When the resin is steam distilled, the iodine value of the resin appears to be somewhat lowered. Means may be used to free this occluded water from the hardened resin, by reheating and melting the resin.

When the described process has been carried to the desired degree, the resin is removed from the distilling and drying vessel and placed in suitable collecting troughs or shallow pans where it is allowed to cool and harden. The resin so prepared in accordance with this invention is found to have a pale yellow color, and is very clear and hard, having an iodine number of about 150 and an acid number of about 0.8, a yield of 34.4 g. per 100 c. c. of mixture of pinene and toluene being obtained.

Resins have also been prepared in accordance with this invention by reacting in the manner described terpenes alone, such as pinene and dipentene, and also by reacting a mixture of terpenes, such as turpentine. For example, 300 c.c. of pinene reacted in the manner described above, using 11.4 grams of catalyst per 100 c.c. of pinene, gave a yield of resin of 52.5 grams per 100 c. c. of pinene. The resin produced was hard and clear and amber yellow in color, having an iodine number of approximately 166.0. When a mixture of terpenes, such as commercial turpentine, is used as one of the starting materials, the resin is found to have a color shading from amber to a cherry red.

The proportions of the reacting materials may be varied widely, as for example, resins are obtained in appreciable quantities from the use of almost all proportions of these reacting materials. The optimum yield of resin has usually been obtained by the use of larger proportions of substituted benzene than of terpene. As set forth above, such characteristics of the resins, including color, iodine and acid numbers, vary somewhat with variations in starting materials used, proportions of starting materials, amount of catalyst, and other factors. The resin produced in accordance with this invention is soluble in petroleum hydrocarbon solvents and is suitable for making coating materials, moulding compounds, and for other useful purposes. The light color of this resin makes it particularly adaptable for use with white and light colored pigments.

As further examples of the carrying out of this invention, the following chart shows the results of the reaction of various terpenes and mixtures of terpenes with substituted benzenes, as well as the reaction of such terpenes and mixtures of terpenes alone.

| No. | Material and fraction | Catalyst g/100 c.c. of active material | Yield of resins g/100 c.c. of active material taken | Iodine no. | Remarks |
|---|---|---|---|---|---|
| 394 | Pinene 157 c.c. Toluene 106 c.c. P:T=1:1[1] | 5.7 | 46.4 g. mix (77.7 g. on basis of pinene) | 157.1 157.9 | Very hard, clear. Pale yellow amber. Steam distilled. |
| 395 | Pinene 157 c.c. Toluene 212 c.c. P:T=1:2. | 5.7 | 34.4 g. mix (81.2 g. on basis of pinene) | 152.2 151.8 | Very hard, brittle, clear. Pale yellow amber. Steam distilled. |
| 396 | Pinene 157 c.c. Toluene 53 c.c. P:T=2:1 | 5.7 | 58.6 g. mix (78.5 g. on basis of pinene.) | 153.5 151.6 | Very hard, brittle, clear. Pale yellow amber. Steam distilled. |
| 400 | Pinene 200 c.c. C.P. C₆H₆ 100 c.c. | 5.7 | 61.2 g. on basis of pinene | 160.7 160.2 | Very hard, brittle, clear. Pale yellow amber. Steam distilled. |
| 403 | Indene—pinene P:I=1:1. | 7.4 | 67.0 mix | 103.0 | Very hard, brittle, clear. Brilliant amber yellow. More brittle than #406. |
| 405 | Amylbenzene—pinene A:P=1:1. | 10.0 | 32.8 mix (63.3 on basis of pinene.) | 138.0 | Very hard, brittle, brilliant amber yellow. |
| 406 | Pinene—300 c.c. | 10.0 | 52.5 | 166.0 | Very hard, brittle, clear. Brilliant amber yellow. |

[1] Equimolecular proportions.

| No. | Material and fraction | Catalyst g/100 c.c. of active material | Yield of resins g/100 c.c. of active material taken | Iodine No. | Remarks |
|---|---|---|---|---|---|
| 422 | Pinene plus 3rd cut [1] Equal volumes. | 3.3 | 67.9 | 161.0 162.9 | Hard, brittle, clear, pale amber yellow. |
| 426 | Xylene plus pinene. X:P=1:1. | 3.3 | 38.2 | 150.5 152.1 | Very hard, clear, brittle. Very pale amber yellow. |
| 427 | Pinene plus 1st cut [2] Equal volumes. | 3.3 | 42.8 | 171.2 173.1 | Very hard, clear, brittle. Pale amber yellow. |
| 428 | Pinene plus mesitylene Equal volumes. | 10.0 | 13.9 | 132.9 134.1 | Very hard, clear, brittle. Pale yellow amber. |
| 434 | Limonene plus xylene. L:X=1:1. | 10.0 | 27.0 g. mix (47.5 g. on basis of limonene) | | Very hard, brittle, clear. Yellow amber, color paler than #442. |
| 435 | Iso-propylbenzene plus limonene. I:L=1:1. | 10.0 | | | Very hard, brittle, clear. Brilliant amber yellow. |
| 442 | d-limonene—54 c.c. C.P. benzene (as diluent) 200 c.c. | 18.5 | 54.2 | | Very hard, brittle, clear. Orange red color. Small clots in suspension. |
| 443 | Dipentene—52 cc. C.P. benzene (as diluent) 200 c.c. | 18.5 | 48.7 | | Hard, brittle, clear, very dark brown. Impure dipentene used. |
| 447 | Pinene plus isopropyl, benzene—1:1 | 10.0 | 27.4 | | Very hard, brittle, clear. Pale amber yellow. |
| 450 | Cedarwood oil—54 c.c. Benzene (diluent)—200 c.c. | 18.5 | 67.5 | | Hard, brittle, clear. Brilliant red orange. So highly polymerized no iodine number could be taken; also jelled in making 53-C varnish. |
| 472 | Cedarwood oil—54 c.c. Benzene (diluent)—100 c.c. | 10.0 | 53.3 | | Hard, brittle, clear reddish amber. |

[1] 3rd Cut=fraction of cracked distillate boiling from approximately 100°C.–175° C.
[2] 1st Cut=fraction of cracked distillate boiling below 70° C.
[3] The abbreviation g. in the above table stands for grams.

While the features herein described constitute preferred embodiments of the invention it is to be understood that the invention is not limited to those precise features, and that changes may be made therein without departing from the scope of the invention which is defined in the appended claims.

What is claimed is:

1. The hard light amber resin produced from hydrocarbons comprising essentially a terpene by reaction in the presence of a metallic halide catalyst at a temperature below 60° C., the resinous reaction product having been freed from the catalyst.

2. The resin produced by the reaction of a mixture of hydrocarbons comprising as the essential ingredients a terpene and an alkyl benzene in the presence of a metallic halide catalyst, the resin being substantially free from catalyst.

3. The resinous reaction product of a terpene with toluene.

4. The resinous product of a terpene with a xylene.

5. A hard resin produced from the resinous reaction product of a mixture of hydrocarbons comprising terpene as the essential ingredient reacted with an alkyl benzene.

6. The resinous reaction product of pinene with toluene.

7. The resinous reaction product of pinene with an alkyl benzene.

8. The light colored resin produced by reacting a mixture of hydrocarbons, the resin forming constituents of the mixture consisting substantially of terpenes in the presence of a metallic halide catalyst below 60° C., the resin being substantially free from catalyst.

9. The resinous reaction product of a relatively pure terpene hydrocarbon reacted with an alkyl benzene in the presence of a metallic halide catalyst below 60° C., the reaction product having been freed from the catalyst.

10. The method in the preparation of a synthetic resin which comprises reacting a mixture of hydrocarbons containing as the essential ingredient a terpene with an alkyl benzene in the presence of a catalyst below 60° C., neutralizing the reaction product, separating the neutralized reaction product, and hardening by heat to form a solid resin.

11. The method in the preparation of a synthetic resin which comprises reacting hydrocarbons comprising essentially a terpene at a temperature below 60° C. in the presence of a metallic halide, neutralizing the resinous reaction product, and separating the resinous product.

12. The method in the preparation of a synthetic resin which comprises reacting a mixture of hydrocarbons containing as the essential ingredient a terpene in the presence of a metallic halide catalyst at a controlled temperature below 60° C., neutralizing the reaction product with precipitation of the catalyst, separating the solution containing the dissolved resinous reaction product from the precipitated catalyst, distilling the solution to separate the resinous reaction product, and heat-hardening such reaction product to produce a hard resin.

13. The method in the preparation of a synthetic resin which comprises reacting a mixture of hydrocarbons containing as the essential ingredients a terpene with an alkyl benzene in the presence of a metallic halide catalyst at a controlled temperature below 60° C., neutralizing the reaction product with precipitation of the catalyst, separating the solution containing the dissolved resinous reaction product from the precipitated catalyst, distilling the solution to separate the resinous reaction product, and hardening such reaction product by heating to produce a hard resin.

14. The light colored hydrocarbon resin produced by reacting a fraction of cracked petroleum distillate with an admixed hydrocarbon material comprising essentially a terpene in the presence of a metallic halide catalyst, the resin product being substantially free from catalyst.

15. The light colored hydrocarbon resin, produced by reacting a fraction of cracked petroleum distillate boiling below 180° C. with an admixed hydrocarbon material comprising essentially a terpene, in the presence of a metallic halide catalyst, the resin being substantially free from catalyst.

16. The light colored hydrocarbon resin produced by reacting at a temperature below 60° C., a fraction of cracked petroleum distillate boiling between 100° C. and 175° C. with a substantially pure terpene in the presence of a metallic halide catalyst, the resin being substantially free from catalyst.

17. The light colored hydrocarbon resin produced by reacting at a temperature below 60° C., a fraction of cracked petroleum distillate boiling below 70° C. with a substantially pure terpene in the presence of a metallic halide catalyst, the resin being substantially free from catalyst.

18. The light colored hydrocarbon resin produced by reacting a fraction of cracked petroleum distillate with pinene in the presence of a metallic halide catalyst.

19. The method in the preparation of a synthetic resin which comprises reacting a mixture of hydrocarbons containing as the essential ingredients a terpene and an alkyl benzene in the presence of a metallic halide catalyst, by adding the metallic halide catalyst until a resin having a predetermined iodine value is obtained, the iodine value of the resulting resin varying inversely with the proporton of metallic halide catalyst used.

CHARLES A. THOMAS

CERTIFICATE OF CORRECTION.

Patent No. 1,939,932. December 19, 1933.

CHARLES A. THOMAS.

It is hereby certified that error appears in the printed specification of the above numbered patent requiring correction as follows: Page 4, line 57, claim 5, for "terpene" read terpenes; and that the said Letters Patent should be read with this correction therein that the same may conform to the record of the case in the Patent Office.

Signed and sealed this 23rd day of January, A. D. 1934.

F. M. Hopkins

Acting Commissioner of Patents.

(Seal)

duced by reacting a fraction of cracked petroleum distillate boiling below 180° C. with an admixed hydrocarbon material comprising essentially a terpene, in the presence of a metallic halide catalyst, the resin being substantially free from catalyst.

16. The light colored hydrocarbon resin produced by reacting at a temperature below 60° C., a fraction of cracked petroleum distillate boiling between 100° C. and 175° C. with a substantially pure terpene in the presence of a metallic halide catalyst, the resin being substantially free from catalyst.

17. The light colored hydrocarbon resin produced by reacting at a temperature below 60° C., a fraction of cracked petroleum distillate boiling below 70° C. with a substantially pure terpene in the presence of a metallic halide catalyst, the resin being substantially free from catalyst.

18. The light colored hydrocarbon resin produced by reacting a fraction of cracked petroleum distillate with pinene in the presence of a metallic halide catalyst.

19. The method in the preparation of a synthetic resin which comprises reacting a mixture of hydrocarbons containing as the essential ingredients a terpene and an alkyl benzene in the presence of a metallic halide catalyst, by adding the metallic halide catalyst until a resin having a predetermined iodine value is obtained, the iodine value of the resulting resin varying inversely with the proporton of metallic halide catalyst used.

CHARLES A. THOMAS

CERTIFICATE OF CORRECTION.

Patent No. 1,939,932.  December 19, 1933.

CHARLES A. THOMAS.

It is hereby certified that error appears in the printed specification of the above numbered patent requiring correction as follows: Page 4, line 57, claim 5, for "terpene" read terpenes; and that the said Letters Patent should be read with this correction therein that the same may conform to the record of the case in the Patent Office.

Signed and sealed this 23rd day of January, A. D. 1934.

F. M. Hopkins

Acting Commissioner of Patents.

(Seal)